United States Patent
Jamail et al.

(10) Patent No.: US 8,739,290 B1
(45) Date of Patent: May 27, 2014

(54) GENERATING ALERTS IN EVENT MANAGEMENT SYSTEMS

(75) Inventors: John M Jamail, Sudbury, MA (US); Daniel B Reich, Watertown, MA (US); Catherine V Hart, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/248,572

(22) Filed: Sep. 29, 2011

(51) Int. Cl.
*G06F 11/00* (2006.01)

(52) U.S. Cl.
USPC .......................................... 726/25

(58) Field of Classification Search
USPC ..................................... 726/22–26
See application file for complete search history.

(56) References Cited

U.S. PATENT DOCUMENTS

| | | | |
|---|---|---|---|
| 7,752,125 B1* | 7/2010 | Kothari et al. | 705/38 |
| 7,908,660 B2* | 3/2011 | Bahl | 726/25 |
| 8,595,844 B2* | 11/2013 | Bahl | 726/25 |
| 2006/0020814 A1* | 1/2006 | Lieblich et al. | 713/182 |
| 2006/0123482 A1* | 6/2006 | Aaron | 726/25 |
| 2007/0208600 A1* | 9/2007 | Babus et al. | 705/7 |
| 2008/0189788 A1* | 8/2008 | Bahl | 726/25 |
| 2009/0235354 A1* | 9/2009 | Gray et al. | 726/22 |
| 2011/0131658 A1* | 6/2011 | Bahl | 726/25 |
| 2011/0202486 A1* | 8/2011 | Fung et al. | 706/12 |
| 2012/0304300 A1* | 11/2012 | LaBumbard | 726/25 |
| 2013/0018677 A1* | 1/2013 | Chevrette | 705/4 |

* cited by examiner

*Primary Examiner* — Samson Lemma
(74) *Attorney, Agent, or Firm* — Krishnendu Gupta; Jason A. Reyes

(57) ABSTRACT

There is disclosed techniques for generating alerts in an event management system which comprises event management device and risk assessment device. In one example, a method comprises the following steps. There is received data in an event management device related to events associated with an asset in a network environment. The received data is filtered in order to provide an input to risk assessment device. The filtered data is forwarded to risk assessment device. A score indicative of risk based on filtered data is determined in risk assessment device. The score is forwarded to event management device and received in event management device. A score chart is generated in the event management device. The score chart includes the score and enables the prioritization of threats based on their respective scores.

16 Claims, 4 Drawing Sheets

60 →

| ALERT | DESCRIPTION | SCORE |
|---|---|---|
| 1 | PROBABLE THREAT | 570 |
| 2 | PROBABLE THREAT | 350 |
| 3 | PROBABLE THREAT | 720 |
| 4 | PROBABLE THREAT | 380 |
| 5 | PROBABLE THREAT | 980 |
| 6 | PROBABLE THREAT | 450 |

60 ⟶

| ALERT | DESCRIPTION | SCORE |
|---|---|---|
| 1 | PROBABLE THREAT | 570 |
| 2 | PROBABLE THREAT | 350 |
| 3 | PROBABLE THREAT | 720 |
| 4 | PROBABLE THREAT | 380 |
| 5 | PROBABLE THREAT | 980 |
| 6 | PROBABLE THREAT | 450 |

GENERATING ALERTS IN EVENT MANAGEMENT SYSTEMS

FIELD OF THE INVENTION

The invention relates to generating alerts in event management systems.

DESCRIPTION OF THE PRIOR ART

It is known to deploy security information and event management (SIEM) systems to facilitate security-related operations in data processing systems, especially in large systems as may constitute a data center of an organization for example. The SIEM system is used to collect security-related data from the data processing system, such as data from event logs describing detected activities in the system that may have security implications, and to assist security-focused personnel in carrying out security procedures. These may include real-time monitoring of a system to detect and neutralize attacks or threats; mining historical data for auditing or forensic purposes; and analyzing the data processing system for security vulnerabilities in the interest of improving system security. As a collection point for security-related data, a SIEM system typically includes a database in which the security-related data is stored, and software tools that users employ to gather and analyze relevant data.

Conventional enterprises typically utilize a variety of security platforms to provide security controls with respect to information controlled by an enterprise. For example, certain SIEM platforms, such as the enVision® platform available from RSA, The Security Division of EMC, of Bedford, Mass., are configured to collect event or log data, such as security related events or authentication events, generated by event sources, such as servers, routers, switches and the like present on an enterprise's network. As the security platform collects the event log data, the security platform stores the event data in the database. Based upon the event data stored in the database, an administrator can query the security platform and retrieve data reports regarding network, file, application, and user activity tailored to a variety of compliance requirements. Additionally, based upon the log data stored in the database, the security platform can provide the administrator with security event alerts that allow the administrator to see security threats and risks in real time and to take effective actions to mitigate those threats and risks.

SUMMARY OF THE INVENTION

A method and system for generating alerts in event management systems comprising an event management device and a risk assessment device is disclosed. Data is received in the event management device related to security events associated with at least one asset. Data related to security events associated with the at least one asset is forwarded to the risk assessment device. The risk assessment device determines a score indicative of risk based on the forwarded data related to security events associated with the at least one asset. The score indicative of risk from the risk assessment device is forwarded to the event management device. The score indicative of risk is received in the event management device. The event management device generates an alert including the score in response to receiving the score indicative of risk.

BRIEF DESCRIPTION OF THE DRAWINGS

The invention will be more clearly understood from the following description of preferred embodiments thereof which are given by way of example only with reference to the accompanying drawings in which.

DETAILED DESCRIPTION

Figure 1:
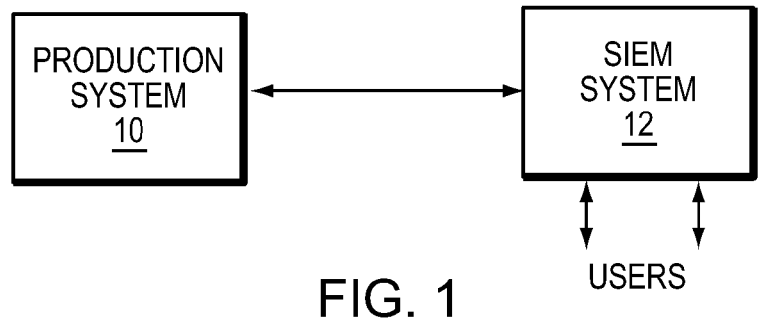
FIG. 1 is a block diagram of a system that may utilize the technique described herein.

The invention can be implemented in numerous ways, including as a process, an apparatus, a system, a composition of matter, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is disclosed herein a technique for generating alerts in event management systems. For example, the event management systems may be those available from RSA, The Security Division of EMC, of Bedford, Mass. Through the use of risk based rules the technique can assign relative priorities to the alerts based on actual events that can help a security analyst or administrator to decide which alerts to review first. The rules may take into account feedback from the administrator about not only the rules but the values which were compared from the events which triggered the rule.

For example, a security analyst or administrator may regularly review the remote network logon logs in order to establish suspicious access attempts. One of many common checks would be to compare an employee's office location against the geographic source of a network connection. While this may work well for a large majority of the employees it may be that occasionally an employee will travel outside their home region and access the corporate network. This would generate a large amount of noise for a typical company with global operations.

A risk based rule may allow the security analyst to review and flag an alert as non-suspicious after having determined that the employee is legitimately logging in from a different geographic location. A risk engine can learn the employee's behavior over time and ultimately score an event with a much lower risk score compared with an employee who does not travel. More importantly it may be able to compare the different geographic regions. For example, an employee who is known to travel occasionally to Japan may still generate a higher level risk score when an access is attempted from a geographic zone that may not have been previously associated with the employee.

Advantageously, the security analyst or administrator reviewing the alert may assign relative values to the security alert being reviewed in order to raise or lower the importance of the event. In addition, the security analyst may potentially tag content variables. The risk engine may take these inputs and use them to process future alerts. Once the risk engine is sufficiently configured, the alerts may be processed by the risk engine for classification and triage before presentation to the administrator. The risk engine may produce a triaged and prioritized view of the alerts for the administrator.

The alert information sent to the risk engine may contain the alert summary and the parsed field data from the events which triggered the alarm. Asset information and prior risk score associated with this alert may also be sent to the risk engine.

A further advantage is that the risk enabled rules help to pass along the proper inputs to the risk engine. The risk engine then looks at these inputs in the context of its risk model and assigns a score. If the risk score is high enough, an alerter generates an alert that is visible to the administrator. Advantageously, the alerter is given two paths to send an alert. One is visible to the administrator, the other is to route the alert for further consideration and processing. These choices provide confidence filtering for alerts.

Referring to FIG. 1, there is illustrated a system comprising a production system 10 and a security information and event management (SIEM) system 12 that may utilize the technique as described herein. As generally known in the art, the production system 10, such as that used by an enterprise, is that portion of the data processing system used to deliver desired production-oriented services to a set of end users or users. The SIEM system 12, for example, the enVision® platform available from RSA, The Security Division of EMC, of Bedford, Mass., serves essentially an overhead function of helping secure the production system 10 from various kinds of data security threats, including intrusions, data theft or destruction, viruses and other malware, etc. For example, the data processing system 10 may be operated by a financial institution, and the production system 10 may include assets, for example, a large set of hardware and software resources that provide on-line financial services to a large number of customers, while the SIEM system 12 is used to help manage security-related aspects of operation of the production system 10.

Figure 2:
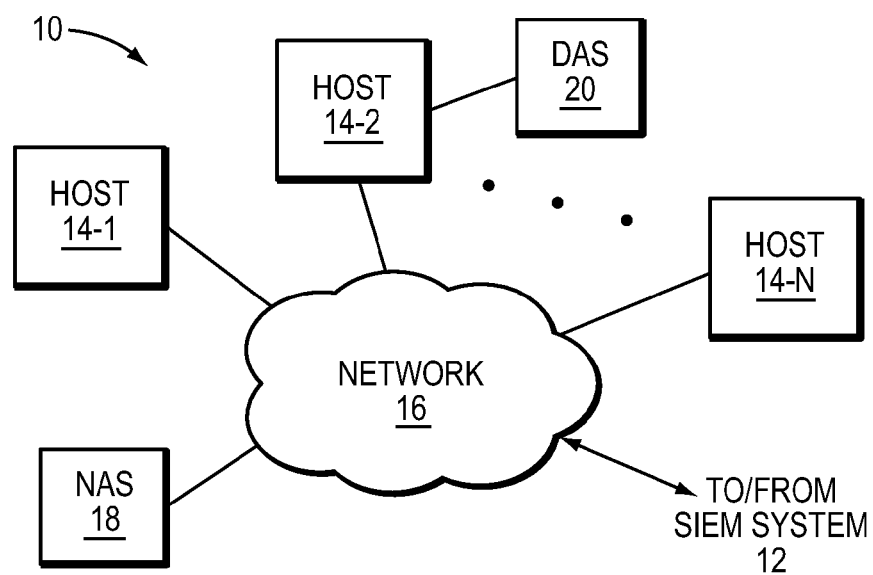
FIG. 2 is a block diagram of a production system portion of the system of FIG. 1.

Referring to FIG. 2, there is illustrated a possible configuration of the production system 10. It includes a plurality of computers or "hosts" 14 (shown as 14-1 through 14-N) coupled together by a network 16. Data storage resources are specifically shown in two possible forms, one being network-attached storage or NAS 18, and the other being direct-attached storage or DAS 20. In this description, DAS 20 represents storage resources/devices that are directly connected to a given host 14, as well as storage resources that may be deployed in a so-called storage area network or SAN (not specifically shown in FIG. 2) which will generally be shared by multiple neighboring hosts 14, such as within a building.

Figure 3:
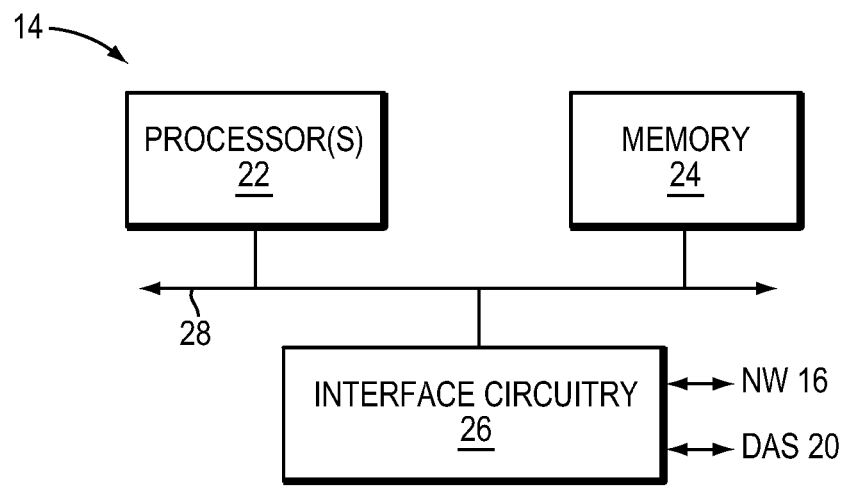
FIG. 3 is a block diagram of a computer illustrating hardware components.

Referring to FIG. 3, there is illustrated a block diagram of hardware resources of a typical host 14. This include one or more processors 22, memory 24, and interface circuitry 26 all coupled together by interconnect circuitry 28 (such as one or more high-speed data buses). The interface circuitry 26 connects the host 14 to the network 16 and/or DAS 20, for example. In the present description, some or all of the items of FIG. 3 may be referred to as "processing circuitry".

Figure 4:
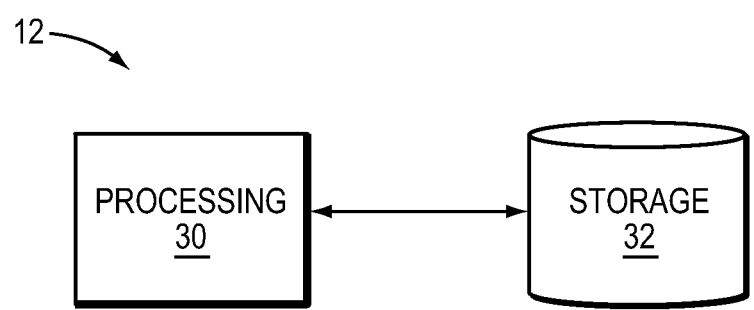
FIG. 4 is a block diagram of a security information and event management (SIEM) system portion of the system of FIG. 1.

Referring to FIG. 4, there is illustrated a high-level organization of the STEM system 12, including a processing sub-system 30 and a storage sub-system 32. The storage sub-system 32 generally includes hardware storage devices (e.g., disk drives) with high-speed external data connections, as well as certain software used to store data on the storage devices and retrieve data from the storage devices. The processing sub-system 30 may include one or more server-type computers (having a hardware organization similar to that shown in FIG. 3 for hosts 14 and certain operating software that provides a set of STEM-related functions.

Figure 5:
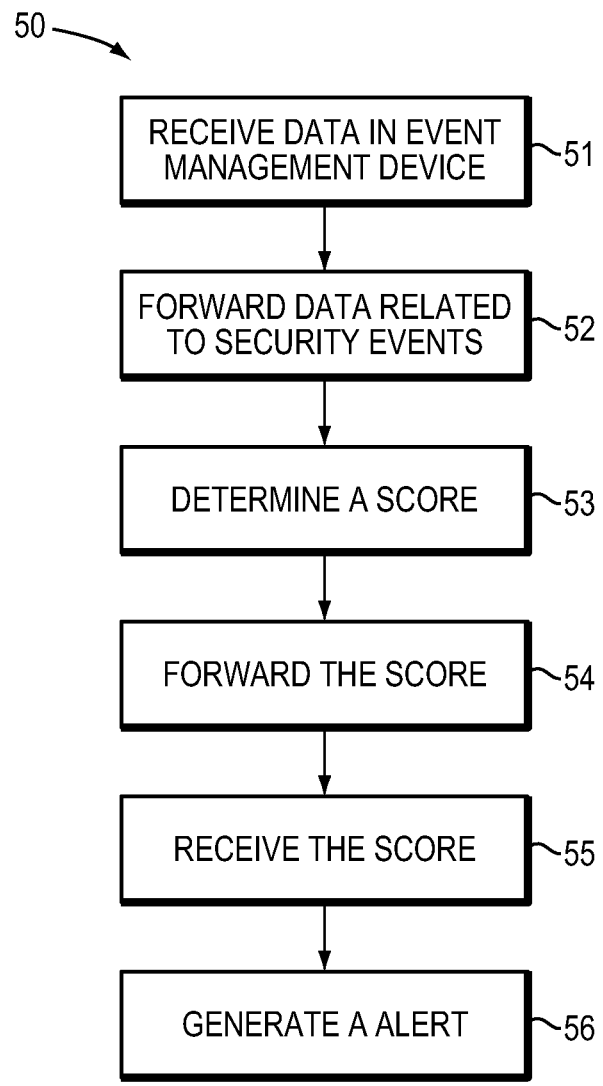
FIG. 5 is a flowchart summarizing the steps for generating alerts.

Referring to FIG. 5 there is illustrated a technique 50 for generating alerts in an event management systems comprising an event management device and a risk assessment device. The event management device may be disposed in electrical communication with the risk assessment device. For example, the event management device and the risk assessment device may be included in the SIEM system 12. The technique as described herein can receive 51 data in the event management device related to security events associated with at least one asset. For example, the at least one asset may be located in the production system 10. As used herein "data" may refer to data related to security events associated with an asset, for example, failed logins or unauthorized access, vulnerabilities of the asset, for example, non-compliance with a network policy or misconfigurations, and the importance of the asset. As used herein, an "asset" may refer to an endpoint node or terminal, a host computer, a router, a bridge, a server, a printer, a storage device, an I/O device or the like. The technique can forward 52 data related to security events associated with the at least one asset to the risk assessment device. The technique can determine 53 in the risk assessment device a score indicative of risk based on the forwarded data related to security events associated with the at least one asset. In one embodiment, the score is reflective of the significance of the risk. For example, the score is a numerical value in a range whereby the higher the number the greater the significance of the risk. The technique can forward 54 the score indicative of risk from the risk assessment device to the event management device. The technique can receive 55 the score indicative of risk in the event management device. The technique can generate 56 in the event management device an alert including the score in response to receiving the score indicative of risk.

In one embodiment, the technique can forward from the event management device to the risk assessment device subsequent to generation of the alert further data related to security events associated with at least one asset for facilitating an update of the score. The data may include further security data as well as the old score. In such an implementation, the risk assessment device may determine a new score and forward the new score to the event management device which may in turn generate a new alert including the new score. For example, the further data may be determined by the risk assessment device to be of such significance the risk assessment device may change or alter the score based on the further data.

In another embodiment, the technique can set a score threshold. For example, the score threshold may be a numerical value. The event management device may be configured to generate an alert in response to the score exceeding the score threshold. In such an implementation, the event management device only generates alerts deemed to be significant treats. In other words, the alerts must have a score exceeding the score threshold. It will be readily apparent to those skilled in the art that the score threshold may be selectable.

In another embodiment, the technique can filer the data received in the event management device that is related to security events associated with the at least one asset. In another embodiment, the technique is configured for forwarding the filtered data to the risk assessment device so that the risk assessment device is not overloaded with data but only receives the data deemed to be relevant.

The advantages of the technique are many. The ability to triage and understand voluminous security information is critical for security analysts. An analyst can only review a certain number of alerts per hour and the more time that is spent on false positives or low priority alerts the less time they have for more critical ones. The technique as described herein has the ability to intelligently assign risk to an alert which can greatly aid the analyst in getting to the most important alerts quickly while minimizing the risk that they will miss a vital alert.

Conventionally, the alert engine used simple logic rules to look for sequences of events from one or more distinct event sources. These rules can be filtered to include or exclude specific types of events but do not provide the ability to weight the input values being evaluated within the rule logic. Risk can be applied to the alert by assigning priorities to alerts. However, the advantage of the technique described herein is that the score reflects the significance of the alert enabling ready comparison with other alerts. Furthermore, the rules conventionally were binary in the sense that they are either on or off. They cannot be intelligently engaged or disengaged based on other factors on the network. The technique as described herein has the ability to constantly update the score based on the further data. For example, the score may be subsequently reduced below the threshold meaning the alert is no longer of great importance. Conversely, the score may be increased so that it is now of real importance based on the further data.

Figures 6, 7:
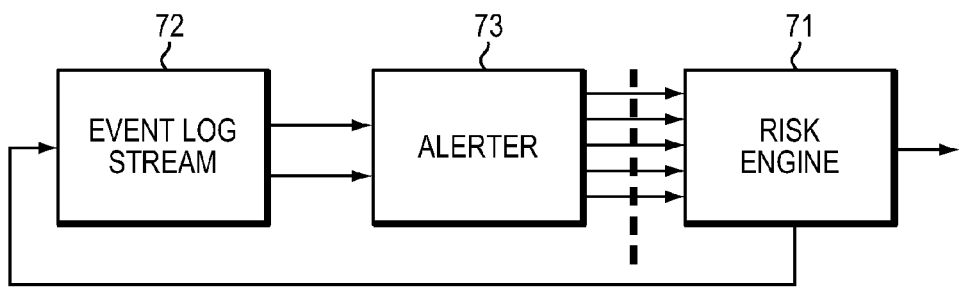
FIG. 6 is an example of a score chart generated by the event management system.
FIG. 7 is an example of an event management system that may utilize the technique described herein.

Referring to FIG. 6, there is illustrated a score chart 60 generated by the event management system. The score chart is forwarded to the administrator to enable an administrator to identify the threats of greatest importance. The figure identifies six probable threats that are scored in order to enable the administrator to prioritize the most likely threats. A common challenge with real-time alerts in relatively large network environments involves the prioritization of the event alerts. For example, in typical enterprise networks, conventional security platforms provide an administrator with security event alerts that allow the administrator to take effective actions to mitigate potential threats and risks. However, conventional event alerts do not provide the administrator with context for reliable prioritization. Accordingly, in cases where the security platforms provide a relatively large volume of event alerts to the administrator, critical events do not necessarily stand out to the administrator as being relatively more important than other events included as part of the event alerts. In such a case, the administrator can fail to properly address certain critical events in a time effective manner. The score chart illustrated in the figure enables the administrator to readily identify Alert 5 as the most dangerous and probable threat. The administrator is, therefore, presented with a score chart identifying Alert 5 as most likely threat, Alert 3 as the second most likely and so on.

Referring to FIG. 7, there is illustrated an example of the event management system that may utilize the technique as described herein. The event management system comprises an event management device 70 and a risk assessment device, for example, a risk engine 71. The event management device comprises a log 72 and an alerter 73. The risk engine 71, for example, a bayesian engine, has a feedback capability to the log 72 for delivering the score to the log which in turn delivers the score to the alerter 73. The log 72 is in communication with the alerter 73.

An embodiment may implement the techniques herein using code executed by a computer processor. For example, an embodiment may implement the techniques herein using code which is executed by a processor of the event management system. As will be appreciated by those skilled in the art, the code may be stored on the event management system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for generating alerts in an event management system, wherein the event management system comprises an event management device and a risk assessment device, the method comprising:
   receiving, in the event management device, data related to events associated with at least one asset in a network environment;
   in response to receiving the data, determining, in the event management device, an alert in connection with an event associated with at least one asset in the network environment;
   filtering, in the event management device, the received data in order to facilitate creation of an input for the risk assessment device, wherein the input comprises information relating to the alert;
   forwarding, from the event management device to the risk assessment device, the input;
   determining, in the risk assessment device, a new score indicative of risk based on the input and an old risk score associated with the alert;
   forwarding, from the risk assessment device to the event management device, the new score indicative of risk;
   receiving, in the event management device, the new score indicative of risk; and in response to receiving the new score indicative of risk, generating, in the event management device, a score chart that enables the identification of the most likely threat based on score.

2. The method as claimed in claim 1, wherein the score is reflective of the significance of the risk.

3. The method as claimed in claim 1, wherein the score is a numerical value in a range whereby the higher the number the greater the significance of the risk.

4. The method as claimed in claim 1, further comprising:
setting a score threshold for a threat; and
generating, in the event management device, the score chart including the new score in response to the new score exceeding the threshold.

5. The method as claimed in claim 1, wherein the events relate to unauthorized access of the at least one asset.

6. The method as claimed in claim 1, wherein the events relate to vulnerabilities of the at least one asset.

7. The method as claimed in claim 1, wherein the at least one asset is one or more of an endpoint node or terminal, a host computer, router, a bridge, a server, a printer, a storage device, an I/O device.

8. The method as claimed in claim 1, wherein the risk assessment device comprises a bayesian engine.

9. A system for generating alerts in an event management system, wherein the event management system comprises an event management device and a risk assessment device, the system comprising:
a hardware processor comprising a program logic for carrying out the steps of:
first logic receiving, in the event management device, data related to events associated with at least one asset in a network environment;
in response to receiving the data, second logic determining, in the event management device, an alert in connection with an event associated with at least one asset in the network environment;
third logic filtering, in the event management device, the received data in order to facilitate creation of an input for the risk assessment device, wherein the input comprises information relating to the alert;
fourth logic forwarding, from the event management device to the risk assessment device, the input;
fifth logic determining, in the risk assessment device, a new score indicative of risk based on the input and an old risk score associated with the alert;
sixth logic forwarding, from the risk assessment device to the event management device, the new score indicative of risk;
seventh logic receiving, in the event management device, the new score indicative of risk; and
in response to receiving the new score indicative of risk, eighth logic generating, in the event management device, a score chart that enables the identification of the most likely threat based on score.

10. The system as claimed in claim 9, wherein the score is reflective of the significance of the risk.

11. The system as claimed in claim 9, wherein the score is a numerical value in a range whereby the higher the number the greater the significance of the risk.

12. The system as claimed in claim 9, further comprising:
ninth logic setting a score threshold for a threat; and
tenth logic generating, in the event management device, the score chart including the new score in response to the new score exceeding the threshold.

13. The system as claimed in claim 9, wherein the events relate to unauthorized access of the at least one asset.

14. The system as claimed in claim 9, wherein the events relate to vulnerabilities of the at least one asset.

15. The system as claimed in claim 9, wherein the at least one asset is one or more of an endpoint node or terminal, a host computer, router, a bridge, a server, a printer, a storage device, an I/O device.

16. The system as claimed in claim 9, wherein the risk assessment device comprises a bayesian engine.

\* \* \* \* \*